June 30, 1942.    J. R. MANNING    2,288,474
WHEEL STRUCTURE
Original Filed Aug. 31, 1940
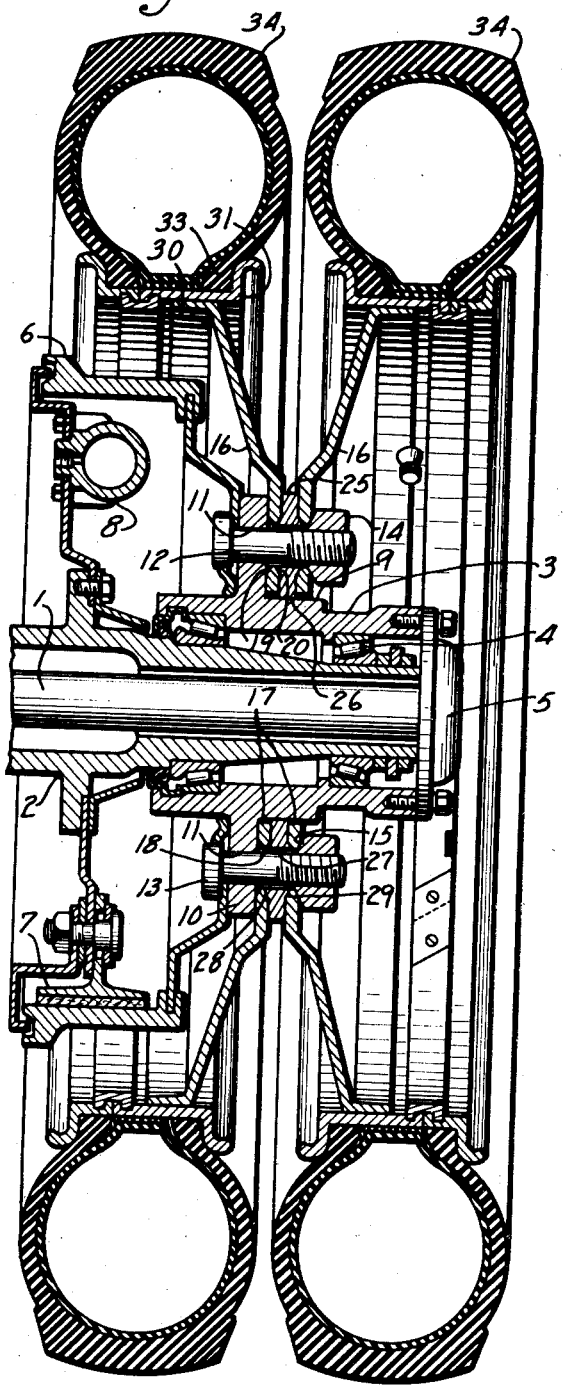
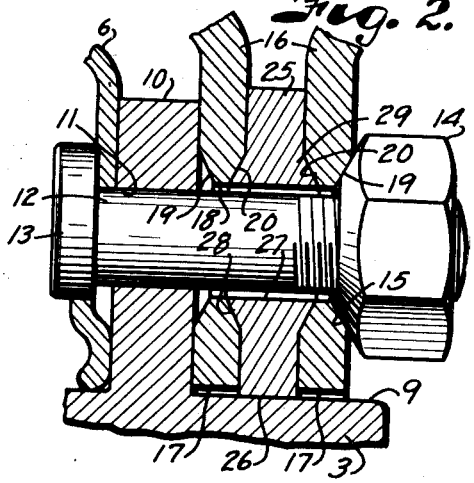
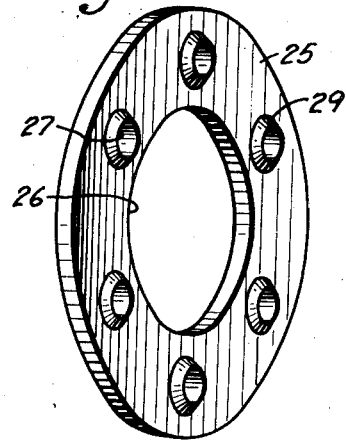
INVENTOR
John R. Manning
BY Arthur P. Brown
ATTORNEY Patented June 30, 1942

2,288,474

UNITED STATES PATENT OFFICE 2,288,474

WHEEL STRUCTURE

John R. Manning, Santa Fe, N. Mex., assignor of one-fourth to Sue Winston and one-fourth to Martha Donaldson, both of Santa Fe, N. Mex.

Original application August 31, 1940, Serial No. 355,075. Divided and this application August 7, 1941, Serial No. 405,772

7 Claims. (Cl. 301—36)

This invention relates to wheel and rim structures and more particularly to single or dual wheel structures for automotive vehicles, the present application being a division of my copending application, Serial No. 355,075, filed August 31, 1940.

The principal object of the present invention is to provide a convenient, relatively economical and highly efficient wheel and rim structure.

Other objects of the invention are to provide for facilitating mounting the wheel structure on axle and like housings; to provide for centering and locking the wheel structure relative to its mounting; and to provide improved elements and arrangements thereof in a wheel structure of the character and for the purposes noted.

In accomplishing these and other objects of the present invention, I have provided improved details of structure, the preferred form of which is illustrated in the accompanying drawing wherein:

Fig. 1 is a vertical cross-section through a wheel structure embodying the features of the present invention showing its relation to a support therefor.

Fig. 2 is a detail vertical cross-section through a portion of the wheel structure adjacent its axis to more clearly illustrate the arrangement of mounting the wheel structure on a support.

Fig. 3 is a detail perspective view of a locking ring for mounting and centering the wheel structure on an axle housing.

Referring more in detail to the drawing:

I designates an automotive vehicle axle having a conventional housing 2 that supports a hub 3 as by roller bearings 4, the axle preferably being connected with the hub as by a cap 5 to drive the hub. A conventional brake drum housing 6 provided with braking shoes 7 operated by conventional hydraulic mechanisms 8 may also be provided in association with the axle and housing therefor.

The hub 3 is preferably provided with an annular shoulder 9 having an annular outwardly extending flange 10 that is provided with spaced apertures 11 for passing fastening devices 12 such as the bolts shown, the bolts being provided with heads 13 and threaded opposite ends to receive nuts 14 that are preferably provided with tapered inner ends 15.

While the present wheel structure may be of single type, it is shown for convenience of illustration to be of dual type, the wheel structure preferably consisting of a body member 16 having a central axial opening 17 that fits about the hub 3 and is of approximately the diameter of the hub. The body member is also preferably provided with spaced apertures 18 of a number equal to the apertures 11 in the hub flange 10, the apertures 18 being bounded by annular recesses forming conical seats 19 and 20 on opposite sides of the apertures.

Where the dual type wheel structure is employed the second or outer wheel is preferably a duplicate of the first or inner wheel and, as shown in Fig. 2, the tapered end 15 of each nut 14 engages the outer conical seats 19 of the aperture bounding portions of the wheel in such a manner as to center the wheel relative to the bolt and form a bearing support therefor.

25, Fig. 3, designates a locking ring which is employed in dual type wheel structures in accordance with the present invention, the locking ring having a central aperture 26 that snugly fits about the hub shoulder 9 in load supporting engagement therewith, as shown in Figs. 1 and 2, yet in removable relation thereto. The locking ring 25 is also provided with a series of spaced apertures 27 that are bounded by outwardly extending annular bosses 28 and 29 on opposite sides thereof, the bosses 28 and 29 having bevelled faces adapted to fit the adjacent conical seats in the recesses in the aperture bounding portions of the wheel structure in reinforcing engagement therewith, as particularly shown in Fig. 2, and thus center, lock and support the wheel structure on the hub, as well as relieve the bolts.

The wheel structure body member 16 projects radially outwardly from the central axial portion thereof and terminates in a laterally turned flange 30 that may be secured as by welding or the like to a rim portion 31 having a suitable bead 32 for mounting the supporting flanges 33 of a pneumatic or like tire 34.

It is preferable to construct the present wheel and rim structure of certain of the common alloys in order to prevent corrosion and also to prevent sticking between the relative parts of the wheel and rim structure and/or a tire thereon.

The operation of a wheel and rim structure constructed as described is as follows:

A single wheel structure may be applied to the shoulder 9 of the hub 3 whereupon the ring 25 is applied to the hub and the apertures of the hub, wheel and ring aligned to center the wheel. Another wheel may then be applied to the hub and the apertures thereof aligned with the apertures in the ring to center the second or outer wheel. The hub bolts are preferably fixed in the hubs, either by a press fit or made stationary by nut and lock on the inside of the hub, substantially as shown. The tapered nuts may then be applied to the bolts for mounting, centering and locking the dual wheel structure in desired position.

A reversal of the operation just described may be employed to remove a wheel or plurality of wheels from an automotive vehicle.

It is apparent, therefore, that a convenient, economical and efficient wheel structure has been provided by the present invention in which the wheels are conveniently, economically and efficiently centered, locked and supported relative to load bearing mountings therefor.

What I claim and desire to secure by Letters Patent is:

1. In a wheel structure of the character described, a support, a hub rotatably mounted on said support and having a flange provided with spaced annularly arranged apertures, wheels mounted on said hub and having apertures alignable with the apertures in said hub, the portions of said wheels bounding said apertures being provided with annular recesses forming conical seats, a ring mounted between said wheels in load-supporting engagement with said hub and having apertures alignable with said wheel and hub apertures, annular bosses on the portions of said ring bounding said apertures therein, said bosses having bevelled faces adapted to engage the adjacent conical seats of the annular recesses of said wheels upon said hub, whereby said ring supports said wheels upon the hub, and means connecting said hub, wheels, and ring together.

2. In a wheel structure of the character described, a support, a hub rotatably mounted on said support and having a flange provided with spaced annularly arranged apertures, disks mounted on said hub and having apertures alignable with the apertures in said hub, the portions of said disks bounding said apertures being provided with recesses forming conical seats, at least one of said disks having a wheel thereon, a ring mounted between said disks in load-supporting engagement with said hub and having apertures alignable with said wheel and hub apertures, bosses on the portions of said ring bounding said apertures therein, said bosses having bevelled faces adapted to engage the adjacent conical seats of the recesses in said disks upon the hub whereby said ring supports the disks upon the said hub, and means connecting said hub, disks and ring together.

3. In a wheel structure of the character described, a hub having a flange provided with spaced annularly arranged apertures, disks having apertures aligned with the apertures of said hub flange, at least one of said disks having a wheel thereon, a ring on the hub engageable with and arranged between said disks, said ring having apertures alignable with the apertures in said disks and hub flange, means connecting said hub flange, disks and ring together, the portions of said disks bounding said apertures having bevelled edges, means on the portions of said ring bounding the apertures therein being engageable and cooperative with the bevelled edges of said apertures in the disks to reinforce said disks and relieve the connecting means whereby the ring supports the disks upon the hub, and a rotatable member carrying the hub.

4. In a wheel structure of the character described, a hub having a flange provided with spaced apertures, wheels having apertures aligned with the apertures in said hub flange, a ring on the hub engageable with and arranged between said wheels, said ring having apertures alignable with the apertures in said wheels and hub flange, means connecting said hub flange, wheels and ring together, portions of said wheels adjacent said apertures having recesses therein, and means on said ring adapted to engage the recesses in the wheels and cooperate therewith to reinforce the wheels and relieve the connection means, whereby the ring supports the wheels upon the hub.

5. In a wheel structure of the character described, a hub having a flange provided with spaced annularly arranged apertures, a disk mounted on said support having apertures alignable with apertures in said flange, the portions of said disk bounding said apertures being provided with recesses forming conical seats, a ring mounted on said support in load-supporting engagement therewith having apertures alignable with said wheel and flange apertures, bosses on the portions of said ring bounding the apertures therein, said bosses having bevelled faces adapted to engage the adjacent conical seats of the recesses in said disk whereby said ring supports the disk upon said hub, and means arranged outwardly of the disk and ring for connecting said flange, disk and ring together.

6. In a wheel structure of the character described, a hub, a flange on the hub provided with spaced annularly arranged apertures, a disk on the hub having apertures alignable with the apertures of said flange, a ring on the hub in load supporting engagement therewith and engageable with said disk, said ring having apertures alignable with the apertures in said disk and flange, and means arranged outwardly of said disk and ring for connecting said flange, disk and ring together, one of said disk and ring being provided with portions bounding said apertures having bevelled edges and the other of said disk and ring being provided with portions bounding the apertures therein engageable and cooperative with the bevelled edges of said first named apertures to reinforce said disk and relieve the connecting means.

7. In a wheel structure of the character described, a hub, a wheel member on the hub having apertures, a ring member on the hub in load supporting engagement therewith and engageable with said wheel member, said ring member having apertures alignable with the apertures in said wheel member, and means arranged outwardly of said wheel member for connecting said wheel and ring members together, one of said members being provided with portions adjacent said apertures having recesses therein, and the other of said members having portions adapted to engage in the recesses in the first named member and cooperate therewith to reinforce the wheel and relieve the connecting means.

JOHN R. MANNING.